(12) United States Patent
Schumacher et al.

(10) Patent No.: US 6,308,657 B1
(45) Date of Patent: Oct. 30, 2001

(54) DRINKING VALVE

(75) Inventors: Egon Schumacher, Barnstorf; Ludger Lehmkuhl, Twistringen, both of (DE)

(73) Assignee: Lubing Maschinenfabrik Ludwig Being GmbH & Co. KG (DE)

( * ) Notice: Subject to any disclaimer, the term of this patent is extended or adjusted under 35 U.S.C. 154(b) by 0 days.

(21) Appl. No.: 09/346,855

(22) Filed: Jul. 2, 1999

(30) Foreign Application Priority Data

Jul. 8, 1998 (DE) .............................................. 198 30 586

(51) Int. Cl.$^7$ ....................................................... A01K 7/02
(52) U.S. Cl. ............................................. 119/72; 119/72.5
(58) Field of Search ................... 119/72, 72.5; 251/339, 251/361, 367

(56) References Cited

U.S. PATENT DOCUMENTS

| | | | | |
|---|---|---|---|---|
| 3,756,199 | * | 9/1973 | Clark, IV | 119/72.5 |
| 4,258,666 | * | 3/1981 | Edstrom | 119/72.5 |
| 4,589,373 | * | 5/1986 | Hostetler et al. | 119/72.5 |
| 4,896,629 | * | 1/1990 | Johnson | 119/72.5 |
| 5,074,250 | * | 12/1991 | Clark, IV | 119/72.5 |
| 5,193,485 | * | 3/1993 | Hostetler | 119/72.5 |
| 5,329,877 | * | 7/1994 | Schumacher | 119/72.5 |
| 5,494,000 | * | 2/1996 | Tanabe | 119/72.5 |
| 5,501,177 | * | 3/1996 | Edstrom, Sr. et al. | 119/72.5 |
| 5,628,278 | * | 5/1997 | Uri | 119/72.5 |
| 6,073,584 | * | 6/2000 | Schumacher | 119/72 |

FOREIGN PATENT DOCUMENTS 0 332 852    2/1989   (EP) ................................ A01K/7/06

* cited by examiner

*Primary Examiner*—Charles T. Jordan
*Assistant Examiner*—Yvonne R. Abbott
(74) *Attorney, Agent, or Firm*—Technoprop Colton LLC (57) ABSTRACT

Drinking valves (11) are usually screwed into water supply lines (10). This type of connection involves relatively high outlay.

The invention proposes a drinking valve (11) which has a casing (12) consisting of an acceptance part (14) and a connecting part (15), a snap-in connection (48) being arranged between the acceptance part (11) and the connection part (15). This snap-in connection (48) makes it possible to push the acceptance part (14) and the connecting part (15) simply and rapidly together. The connecting part (15) can be fastened to the water supply line (10) in some other manner, and in fact permanently if necessary, because the connecting part (15) can remain on the water supply line (10) for repair to the drinking valve (11) by simply releasing the snap-in connection (48).

28 Claims, 5 Drawing Sheets

DRINKING VALVE

The invention relates to a drinking valve for, in particular, small animals such as hens or the like, in accordance with the preamble to claim 1.

The drinking valve referred to here is generally employed in the factory farming of, preferably, small animals such as chicks, hens, geese, ducks, turkeys or the like. The drinking valve makes it possible for the animals themselves to cover their requirement for water.

A plurality of drinking valves are usually associated with an elongated drinking line. For this purpose, the drinking valves are connected to an elongated water supply line in order to form the water supply element of the drinking line. The known drinking valves require a relatively expensive, watertight connection to the water supply line. The drinking valves are, in the main, screwed into the water supply line. For this purpose, both the drinking valves and the acceptance holes in the water supply line must have threads. Such a connection is quite expensive.

The invention is based on the object of creating a drinking valve which ensures a simple and reliable, in particular reliably watertight, connection to a water supply element.

A drinking valve to achieve this object has the features of claim 1. Because the casing of the drinking valve has an acceptance part and a connecting part, which are connected together by connecting means, part of the casing, preferably the connecting part, can always remain on the water supply element, preferably permanently connected to it or even connected to it so that it cannot be released. A plurality of connecting means are preferably provided which make it possible to connect—rapidly and so that they can be released at any time—the other parts of the drinking valve, in particular the connecting part to the valve arrangement, to the part of the casing directly connected to the water supply element, in particular the connecting part, by, in particular, simply pushing them together. The exchange of defective drinking valves can take place in a simple manner because the connecting part of the respective drinking valve remains on the water supply element and, therefore, only the remaining part of the drinking valve has to be exchanged.

In accordance with a preferred embodiment of the invention, the connecting means, preferably snap-in connections, are arranged in the casing, particularly in fact within the casing. In consequence, the connecting means are accommodated in a protected manner in the drinking valve and, more particularly, they are screened from external influences, for example dirt.

In addition, provision is made for the connecting means, in particular snap-in connections, to be arranged outside, preferably below, the water supply line. By this means, the free pipe cross section of the water supply line is not restricted by the connecting means.

In a preferred embodiment of the drinking valve, both the acceptance part and the connecting part have a substantially rotationally symmetrical configuration. In particular, the acceptance part and the connecting part have an approximately sleeve-type shape. Consequently, they can be easily pushed into one another.

So that the production of the preferably snap-in connection between the connecting part and the acceptance part can, in particular, be carried out simply, at least one guide is provided between the acceptance part and the connecting part. The acceptance part and the connecting part preferably have two guides at a distance from one another and arranged on opposite sides of the connection. In this way, the acceptance part can be pushed, with concentric guidance, into the connecting part and, by this means, the connection can be produced simply and, more particularly, without destruction.

In accordance with a further, possibly independent, embodiment of the invention, provision is made for the valve arrangement, in particular an upper pin of the same which is supported in the casing so that it can move up and down, to be secured from falling out of the casing. This facilitates the assembly of the drinking valve.

In a further embodiment of the invention, the drinking valve has two connecting means, in particular snap-in connections, available—and, in fact, additionally to the snap-in connection between the connecting part and the acceptance part of the casing—by means of a snap-in connection between the connecting part of the casing and the water supply element, in particular the water supply line. In this way, the complete drinking valve can be fastened to the water supply element exclusively by snap-in connections. The snap-in connection between the connecting part and the water supply element is preferably designed in such a way that the connecting part can only be released from the water supply element with difficulty or not at all. This ensures that in the case of a defective drinking valve, for example, deliberate release is only possible of the snap-in connection between the acceptance part and the connecting part and, in the case of an exchange of the drinking valve, it is not necessary to exchange the connecting part also because the latter remains on the water supply element, in particular the water supply line.

In accordance with a further development of the invention, the snap-in connection between the connecting part and the water supply element is held, preferably positively, by the acceptance part so that it is practically impossible to release it in an acceptance hole of the water supply element, in particular the water supply line. This positive locking of the snap-in connection between the connecting part of the drinking valve and the water supply line is maintained by a corresponding configuration of the acceptance part of the casing until such time as the snap-in connection between the acceptance part and the connecting part is released.

Two preferred embodiment examples of the invention are explained in more detail below using the drawing. In the drawing.

The drinking valves shown in the figures are used for the water supply to animals, in particular small animals. The drinking valves are, in particular, employed in the factory farming of fowl, for example hens, chicks, broilers or the like. For this purpose, a plurality of drinking valves are connected to a water supply line 10 at a regular distance apart from one another. The water supply 10 and the drinking valves connected to it form a drinking line. A plurality of such drinking lines can, if required, be arranged in a stall. The drinking valves can, however, also be employed in connection with water supply elements configured otherwise. A single drinking valve can, for example, be arranged on the end surface of a pipe carrying water or a hose.

Figure 1:
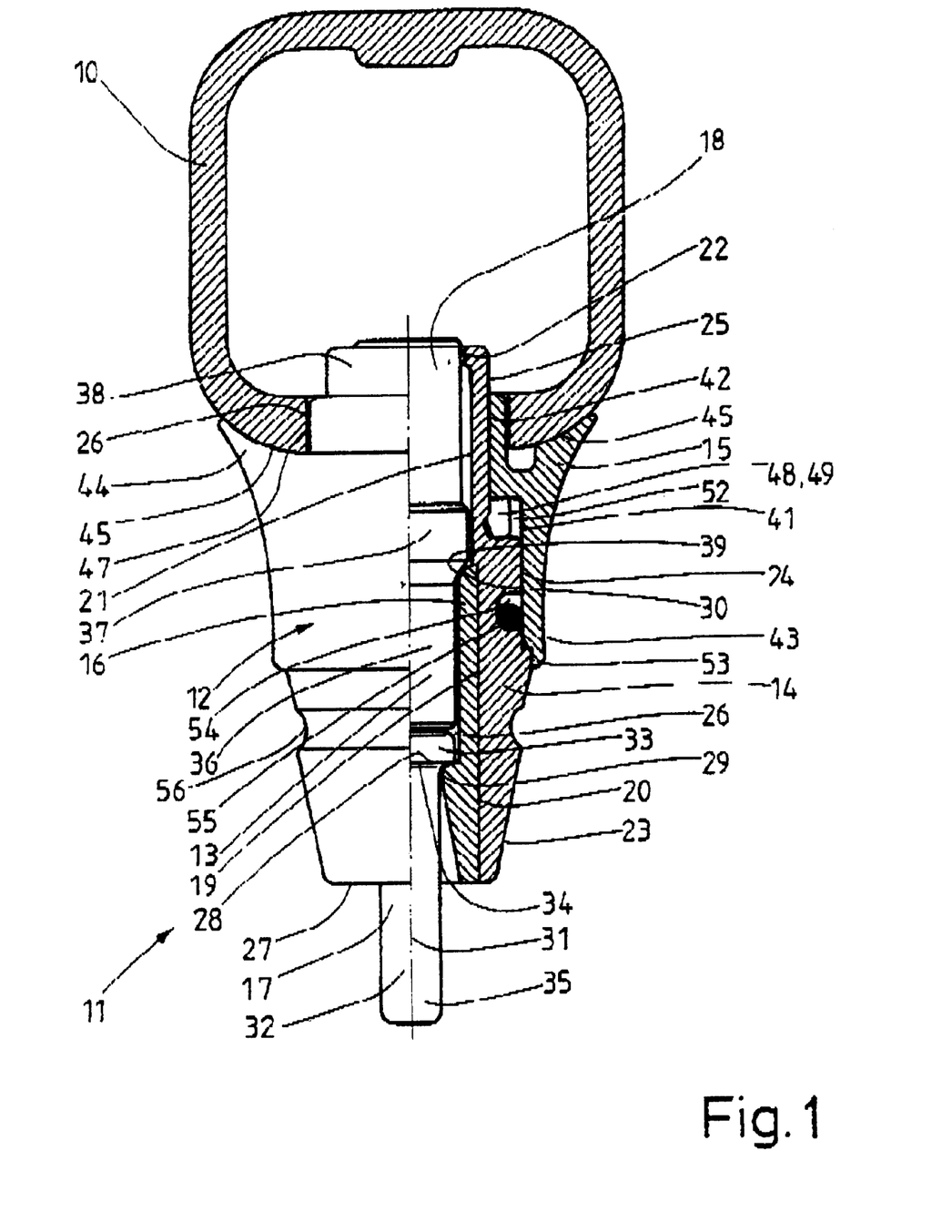
FIG. 1 shows a cross section through a water supply line with a drinking valve fastened onto it, in longitudinal (half-)section.
Figure 6:
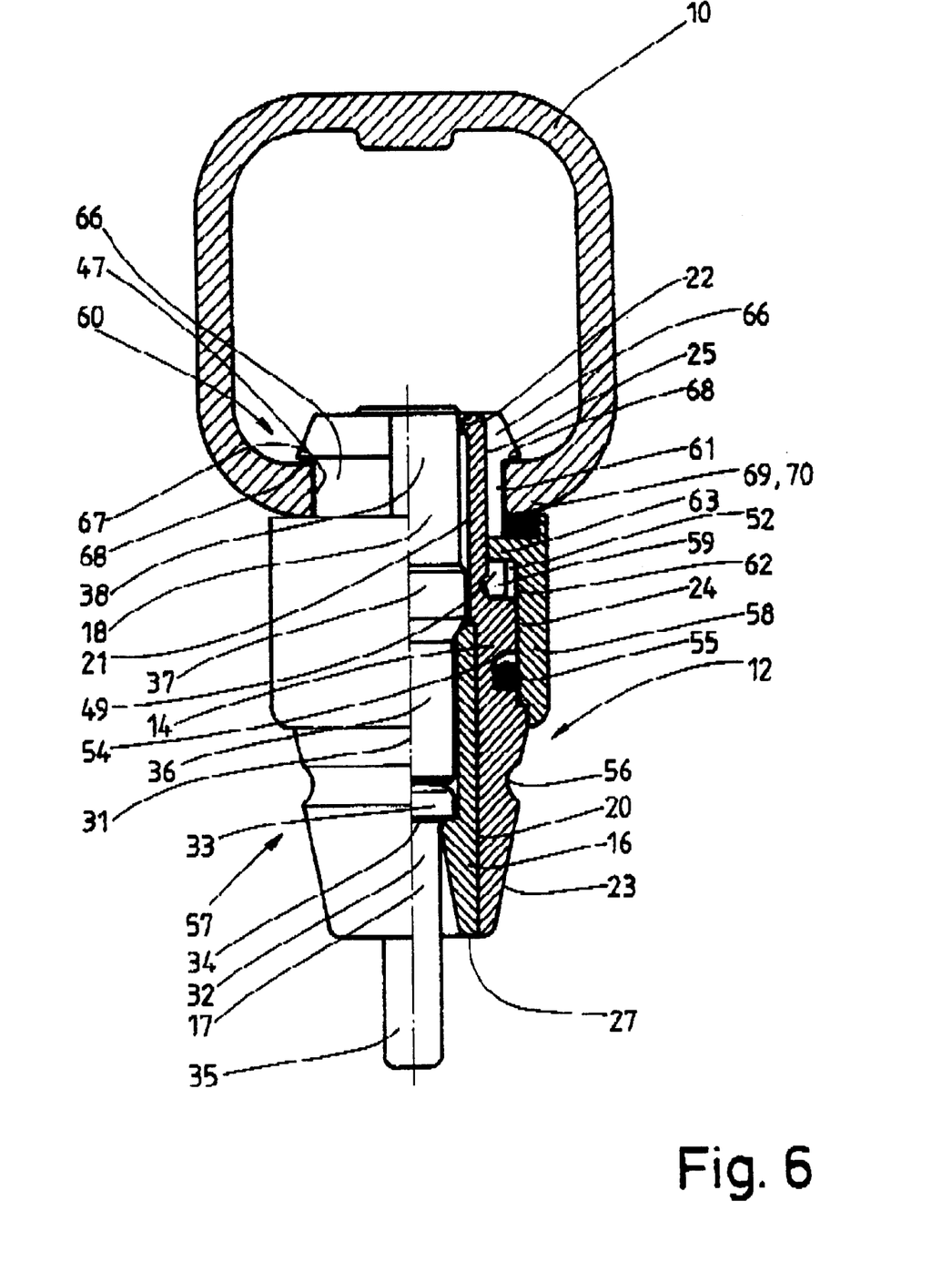
FIG. 6 shows a cross section through a water supply line with a drinking valve fastened onto it, in a longitudinal half-section in accordance with a second embodiment example of the invention.

FIGS. 1 and 6 show a part of a drinking line and, in fact, a cross section through the water supply line 10 and a drinking valve connected to it in a partial longitudinal (half-)section. In the embodiment example shown, the water supply line 10 has a square cross section with rounded corners. The drinking valves are also, however, suitable for employment in a water supply line with a different, for example round, cross section.

The drinking valve 11 in accordance with the first embodiment example of the invention and shown in FIGS. 1 to 5, has a casing 12 with a valve arrangement 13 arranged on it. In the embodiment example shown, the casing 12 is configured in three parts and has, namely, an acceptance part 14, a connecting part 15 and an insert sleeve 16. The valve arrangement 13 consists of a valve pin 17 and an upper pin 18. The drinking valve 11, i.e. the acceptance part 14, the connecting part 15, the insert sleeve 16, the valve pin 17 and the upper pin 18 have a substantially rotationally symmetrical configuration. The insert sleeve 16, the valve pin 17 and the upper pin 18 consist of a metallic material, preferably stainless steel. In contrast, the acceptance part 14 and the connecting part 15 are made of plastic, in particular a thermoplastic.

Figure 2:
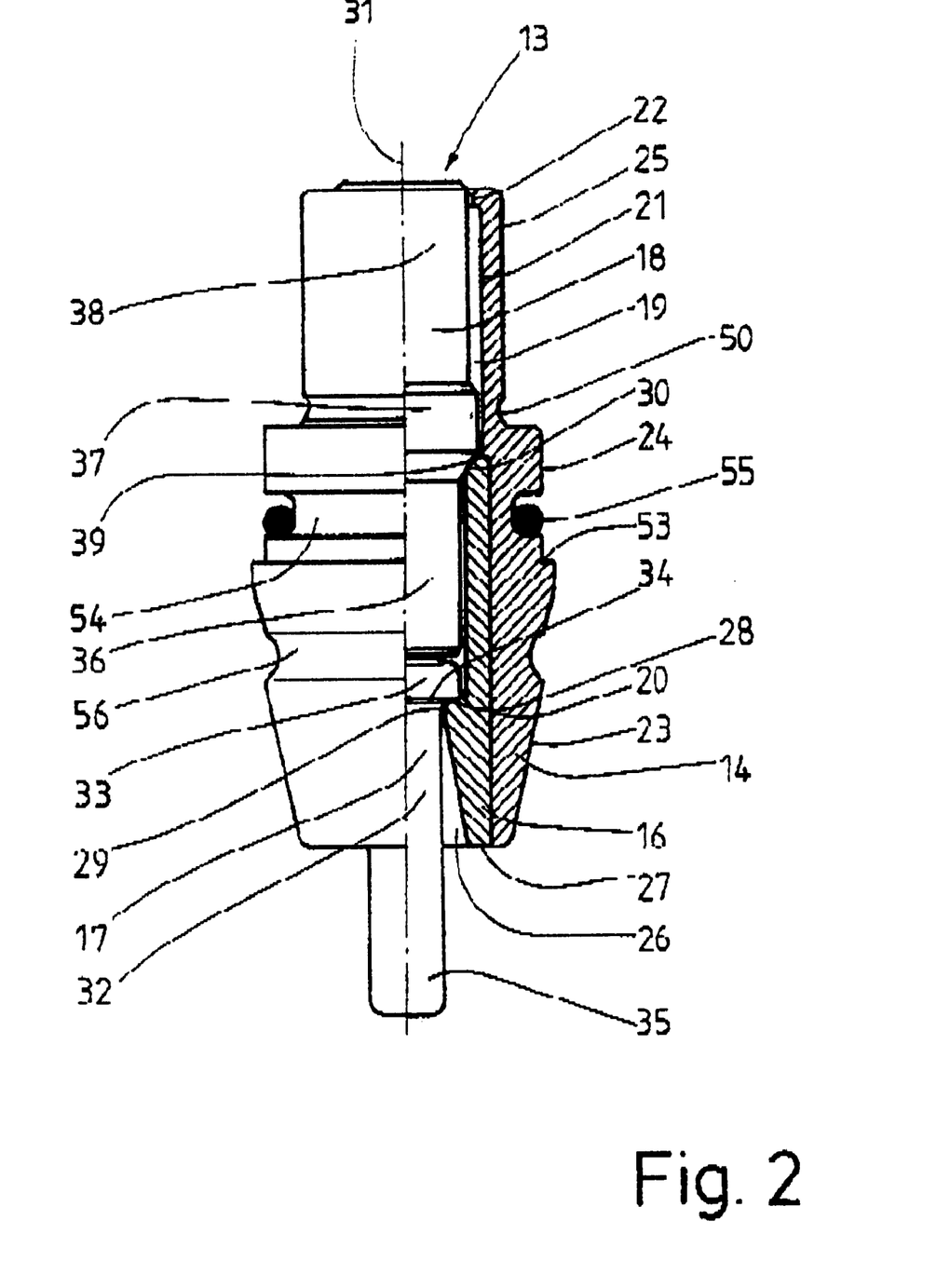
FIG. 2 shows a part of the drinking valve of FIG. 1 in a longitudinal half-section.

The acceptance part 14 of the casing 12 has an approximately sleeve-type configuration. It has a cylindrical inner hole 19 consisting of three stepped sections 20, 21 and 22 of different diameters. A longer, lower section 20 has the largest diameter. The section 21 with a somewhat smaller diameter abuts onto it. Finally, a short section 22 with a diameter smaller than that of the section 21 is located at the upper end of the inner hole 19 of the acceptance part 14. By this means, the section 22 forms a collar-shaped reduction in area at the upper end of the acceptance part 14, in particular of the section 21.

The outer periphery of the acceptance part 14 has, essentially, three regions 23, 24, and 25. A lower, longer region has a shape which has approximately that of a truncated cone with diameter increasing upwards towards the water supply line 10. A cylindrical region 24, which has a somewhat smaller diameter than the upper, greater diameter of the truncated-cone shaped region 23, abuts onto the region 23. Above the region 24, finally, there is a further cylindrical region 25 whose diameter is again smaller than the diameter of the central region 24.

The insert sleeve 16 is located in the acceptance part 14 of the casing 12. On the outside, the insert sleeve 16 has a cylindrical configuration with a diameter which corresponds to the diameter of the section 20 in the acceptance part 14. The length of the insert sleeve 16 corresponds to the length of the section 20. The insert sleeve 16 is frictionally held by a press fit in the cylindrical section 20 of the inner hole 19 of the acceptance part 14. On the inside, the insert sleeve 16 has a through hole 26 which consists of two parts. A lower part of the through hole 26 is configured in the form of a truncated cone. Starting from the lower end 27 of the casing 12 and the insert sleeve 16, the diameter of this truncated-cone shaped part of the through hole 26 becomes smaller towards the inside of the drinking valve 11. The upper part of the through hole 26 abutting onto the lower truncated-cone shaped part of the through hole 26 has a cylindrical configuration. This cylindrical part of the through hole 26 has a diameter which is larger than the diameter of the truncated-cone shaped part under the cylindrical part. Because of the different diameters of the two parts of the through holes 16, a peripheral reduction in area occurs between the two parts, with an annular contact surface 28 in a horizontal plane and a peripheral rounding, forming a valve seat 29, of the inner edge of the plane contact surface 28. A further valve seat 30 is located on the inside of the upper end of the through hole 26 of the insert sleeve 16.

The valve pin 17 and the upper pin 18 of the valve arrangement 13 are supported so that they can move up and down in the casing 12 of the drinking valve 11 and, in fact, in the through hole 26 of the insert sleeve 16 and the part of the inner hole 19 of the acceptance part 14 located above the insert sleeve 16. The valve pin 17 can, in addition, be tipped in the insert sleeve 16 in such a way that the longitudinal centre line of the valve pin 17 can be brought out of coincidence with the longitudinal centre line 31 of the drinking valve 11.

The valve pin 17 has an elongated, cylindrical stem 32 which has, at its upper end, a head 33 with a diameter which is larger than that of the stem. A peripheral lower collar 34 of the head 33 is in contact with the contact surface 28 in the insert sleeve 16 when the drinking valve is closed. The valve seat 29 of the insert sleeve 16 then corresponds with a rounding in the transition region between the stem 32 and the head 33 of the valve pin 17. The length of the stem 32 of the valve pin 17 is dimensioned in such a way that a part of the stem 32 of the valve pin 17, preferably approximately half the length of the stem 32, protrudes out of the drinking valve 11 relative to the lower end 27 of the casing 12. This lower region of the stem 32 of the valve pin 17 and protruding freely relative to the lower end 27, forms an actuation end 35 of the drinking valve 11 by means of which the animals can open the drinking valve 11 with their beaks by either tipping the valve pin 17 to the through hole 26 of the insert sleeve 16 or by lifting the valve pin 17.

The upper pin 18 arranged above the valve pin 17 has a substantially cylindrical configuration. It has a lower cylindrical section 36, a central cylindrical section 37 and an upper cylindrical section 38. The lower cylindrical section 36 of the upper pin 18 is located in the upper, cylindrical region of the insert sleeve 16 and has, relative to the latter, a slightly smaller diameter. The central cylindrical section 37 of the upper pin 18 is located in the cylindrical section 21 of the acceptance part 14 and likewise has, relative to the latter, a smaller diameter. The upper cylindrical section 38 of the upper pin 18 largely extends above the section 21 of the acceptance part 14 of the casing 12 and above the upper section 22 of the acceptance part 14, the upper surface of the upper pin 18 terminating approximately flush with the upper surface of the acceptance part 14 of the casing 12 or protruding slightly above it. The diameter of the upper cylindrical section 38 of the upper pin 18 is dimensioned in such a way that it is clearly smaller than the diameter of the section 21 and slightly smaller than the section 22 of the acceptance part 14. Between the lower cylindrical section 36 and the central cylindrical section 37, the upper pin 18 only has a truncated cone shaped sealing surface 39, which is in contact with the rounded valve seat 30 at the upper end of the insert sleeve 16 when the drinking valve 11 is closed (FIG. 1). When the drinking valve 11 is closed, there is a small gap between the valve pin 17 and the upper pin 18 so that both the valve pin 17 and the upper pin 18 seal the drinking valve 11 on the insert sleeve 16. Tipping or lifting the valve pin 17 removes the sealing contact between the upper pin 18 and the valve pin 17, on the one hand, and the insert sleeve 16, on the other, so that water can emerge out of the drinking valve 11 from the water supply line 10 through the drinking valve 11 at the lower end 27 of the casing 12 and, in consequence, a water supply for the animals can be brought about.

The internal diameter of the upper section 22 of the acceptance part 14 and the external diameter of the central cylindrical section 37 of the upper pin 18 are configured in a particular manner. The external diameter of the central cylindrical section 37 of the upper pin 18 has, namely, a slightly larger dimension relative to the internal diameter of the upper section 22 of the acceptance part 14. In order to assemble the drinking valve 11, the upper pin 18 can be pressed from above into the acceptance part 14 of the casing 12 by means of a slight elastic widening of the upper section 22 of the acceptance part 14. After the central cylindrical section 37 of the upper pin 18 has been pressed through the section 22 of the acceptance part 14, the upper pin 18 is located in the casing 12 of the drinking valve 11 so that it can move freely. The upper pin 18 is, however, prevented from falling out of the casing 12 of the drinking valve 11 due to its own weight by the upper section 22 of the acceptance part 14 of the casing 12 having a slightly smaller diameter than the central cylindrical section 37 of the upper pin 18.

Figure 3:
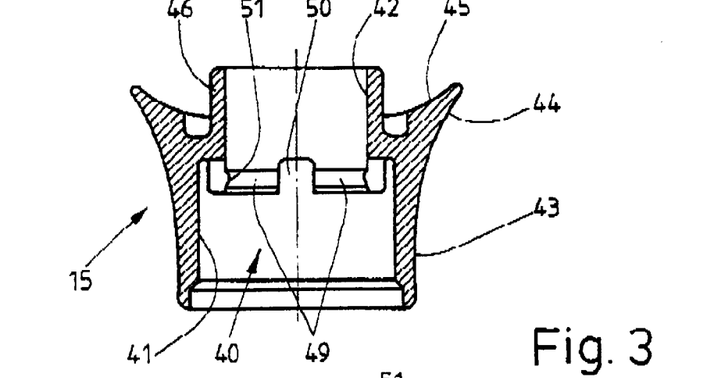
FIG. 3 shows a longitudinal section through a connecting part of the drinking valve of FIG. 1.
Figure 4:
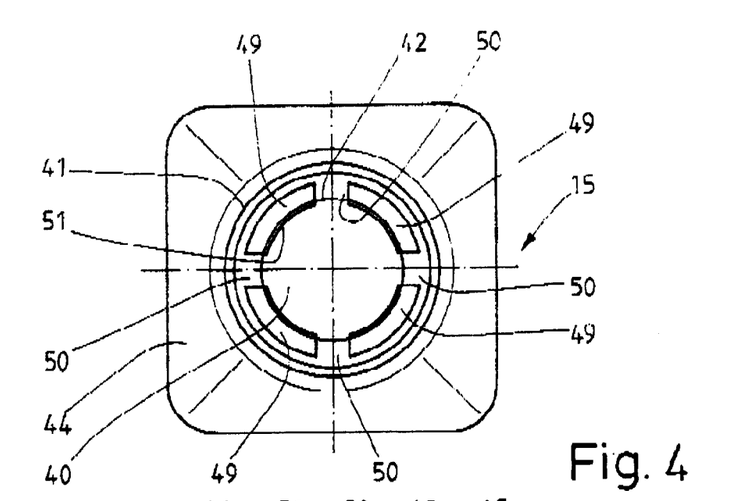
FIG. 4 shows a view of the connecting part of FIG. 3 from below.
Figure 5:
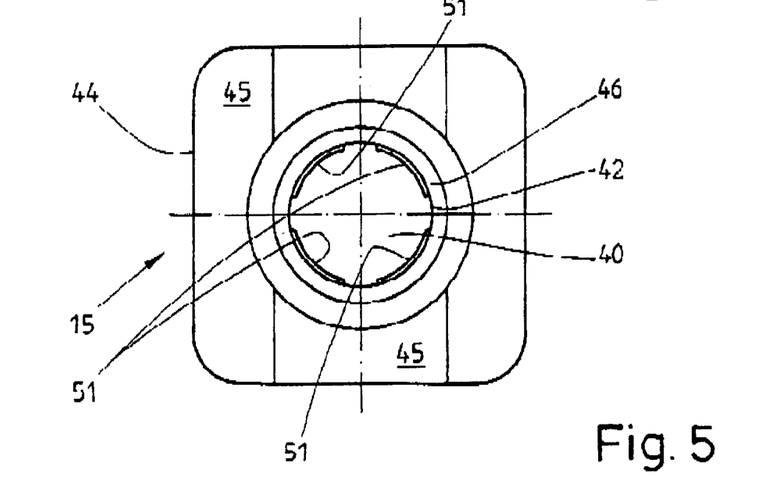
FIG. 5 shows a view of the connecting part of FIG. 3 from above.

The connecting part 15 has a stepped, inner through hole 40 with a lower cylindrical region 41 and a smaller upper cylindrical region 42. The lower cylindrical region 41 corresponds to the central cylindrical region 24 of the acceptance part 14. The upper cylindrical region 42 of the connecting part 15 corresponds to the upper cylindrical region 25 of the acceptance part 14. The diameter of the cylindrical regions mentioned of the acceptance part 14 and of the connecting part 15 are matched to one another in such a way that the sleeve-type acceptance part 14 can be pushed into the sleeve-type internal contour of the connecting part 15, the lower cylindrical region 41 and the region 24, on the one hand, and the upper cylindrical region 42 and the region 25, on the other, forming two independent guides, at a distance from one another, for the acceptance part 14 in the connecting part 15.

The connecting part 15 is provided on the outside with an approximately cylindrical lower section 43 which merges into a widening, approximately square collar 44. The upper end of the square collar 44 has a contact contour 45 which is configured to correspond with the external contour of the lower region of the water supply line 10. In this way, the contact contour 45 is in contact over its entire surface below the water supply line 10. This contact contour 45 is used to connect the connecting part 15 permanently to the water supply line 10, for example by bonding.

The connecting part 15 has a cylindrical section 46, which protrudes upwards relative to the contact contour 45 and whose internal diameter corresponds to that of the upper cylindrical region 42. The external diameter of the cylindrical section 46 has a configuration corresponding to a through hole 47 in the lower wall of the water supply line 10. This smooth, threadless through hole 47 is configured in such a way that the cylindrical section 46 of the connecting part 15 can be pushed into the water supply line 10, it being possible for a connection between the cylindrical section 46 and the through hole 47 to take place in addition to the connection at the contact contour 45, this additional connection in turn taking place by, for example, bonding. The length of the cylindrical section 46 is dimensioned in such a way that the upper end of the same does not protrude into the inside of the water supply line 10; it terminates rather, as in the embodiment example shown, approximately flush with the internal contour of the water supply line 10 (FIG. 1).

The acceptance part 14 with the insert sleeve 16 and the connecting part 15 of the casing 12 are releasably connected together by at least one connecting means which is, in the embodiment example shown, a snap-in connection 48. The snap-in connection 48 is located below the water supply line 10 and is located completely within the casing 12. The snap-in connection 48 is formed by spring tongues 49 on the side of a connecting part 15. In the embodiment example shown, there are four spring tongues 49 (FIGS. 4 and 5) which protrude downwards relative to the cylindrical section 46 of the connecting part 15 and therefore protrude into the lower cylindrical region 41 of greater diameter (FIG. 3). The spring tongues 49 are distributed around the periphery of the cylindrical section 46 and therefore form a continuation, pointing downwards, of the cylindrical section 46, the spring tongues 49 being separated from one another by grooves 50 in the lower extension, for forming the spring tongues 49, of the cylindrical section 46. The spring tongues 49 have protrusions 51 pointing inwards. These protrusions 51 of the spring tongues 49 correspond with a peripheral groove in the acceptance part 14 and, in fact, at the lower end of the region 25 of the acceptance part 14. Corresponding dimensioning of the lengths of the regions 25 and 24 of the acceptance part 14 creates, between the acceptance part 14 and the connecting part 15, an annular space 52 in which the spring tongues 49 of the connecting part 15 can be completely accepted and, in the process, only fill the annular space 52 to such an extent that the spring tongues 49 can be easily pressed outwards by elastic deformation in order to produce and release the snap-in connection 48. The length of the annular space 52 is matched to the length of the spring tongues 49 in such a way that the latter determine or limit the insertion depth of the acceptance part 14 in the connecting part 15 when the drinking valve 11 is assembled.

In the transition between the truncated-cone shaped region 23 and the cylindrical region 24 (of smaller diameter) located above it on the outside of the acceptance part 14, the lower cylindrical region 41 of the connecting part 15 has a step 53 which can likewise be used for limiting the insertion depth of the acceptance part 14 in the connecting part 15. As an alternative, it is conceivable to limit the insertion depth of the acceptance part 14 in the connecting part 15 by the step 53 only and not by the spring tongues 49 and the annular space 52. The annular space 52 can then have a greater length than the spring tongues 49.

In the outer cylindrical region 24, the acceptance part 14 has a groove 54 for accepting a seal which is, in the embodiment example shown, an O-ring 55. The groove 54 has a depth which is smaller than the cross section of the O-ring 55 so that, when the acceptance part 14 is pushed into the connecting part 15, the O-ring 55 is preloaded in order to form a seal between the acceptance part 14 and the connecting part 15. Sealing of the connecting part 15 to the water supply line 10 takes place by the bonding of the connecting part 15 to the water supply line 10.

The special feature of the drinking valve 11 consists in the fact that the snap-in connection 48 is located, in a protected manner, within the drinking valve 11, namely within the casing 12 between the acceptance part 14 and the connecting part 15. The seal formed by the O ring in the embodiment example shown is likewise arranged, in a protected manner, within the casing 12 between the acceptance part 14 and the connecting part 15.

In the drinking valve 11 shown, the connecting part 15 of the casing 12 is connected permanently, namely durably, to the water supply line 10. For the initial assembly of the drinking valve 11 on the water supply line 10, the connecting part 15 is first durably connected to the water supply line 10 by bonding or the like. The other part of the drinking valve 11 is subsequently pushed into the connecting part 15, guided by the guides between the corresponding cylindrical regions of the acceptance part 14 and the connecting part 15, and the releasable snap-in connection 48 is then produced between the acceptance part 14 and the connecting part 15. For this purpose, the spring tongues 49 of the connecting part 15 engage in the peripheral groove 50 in the outer periphery of the acceptance part 14. At the same time, the seal between the acceptance part 14 and the connecting part 15 takes place as a result of a preloading of the O-ring 55 on the insertion of the acceptance part 15 with the valve arrangement 13 and the insertion sleeve 16 into the connecting part 15.

In order to exchange defective drinking valves 11, only the part of the drinking valve 11 shown in FIG. 2, without the connecting part 15, is exchanged. For this purpose, the acceptance part 14, with the parts of the drinking valve 11 arranged within it, is withdrawn downwards out of the connecting part 15, which remains on the water supply line 10, by releasing the snap-in connection 48. In order to facilitate this withdrawal, the lower truncated-cone shaped region 23 of the acceptance part 14 has a peripheral reduction in area 56 which permits the form-fitting application of a tool, which may if required be a special tool. In order to provide a substitute for the defective drinking valve 11, it is sufficient to exchange only the part of the drinking valve 11 shown in FIG. 2, without the connecting part 15.

FIGS. 6 to 9 show a drinking valve 57 in accordance with a second embodiment example of the invention. With the exception of the connecting part 15, this drinking valve 57 corresponds to the drinking valve 11 of FIGS. 1 to 5. The part of the drinking valve 11 shown in FIG. 2 is, furthermore, identical to that of the drinking valve 57. This will not, therefore, be considered in more detail below, where the same reference numbers designate the same parts.

The drinking valve 57 has a special connecting part 58 which is used for producing two snap-in connections 59 and 60. One snap-in connection 59 is located within the casing 12 and corresponds to the snap-in connection 48 of the drinking valve 11; it is therefore used for connecting the acceptance part 14 to the connecting part 58. The second snap-in connection 60 is used for fastening the connecting part 58 in the through hole 47 of the water supply line 10. This snap-in connection 60 is configured in such a way that after the initial fastening of the connecting part 58 of the water supply line 10, it is then practically impossible to release this connecting part 50 from the water supply line 10. The snap-in connection 60 therefore introduces a quasi-unreleasable connection between the connecting part 58 and the water supply line 10. As an alternative, it is conceivable to configure the snap-in connection 60 so that it is releasable like the snap-in connection 59 between the acceptance part 14 and the connecting part 58.

Figure 7:
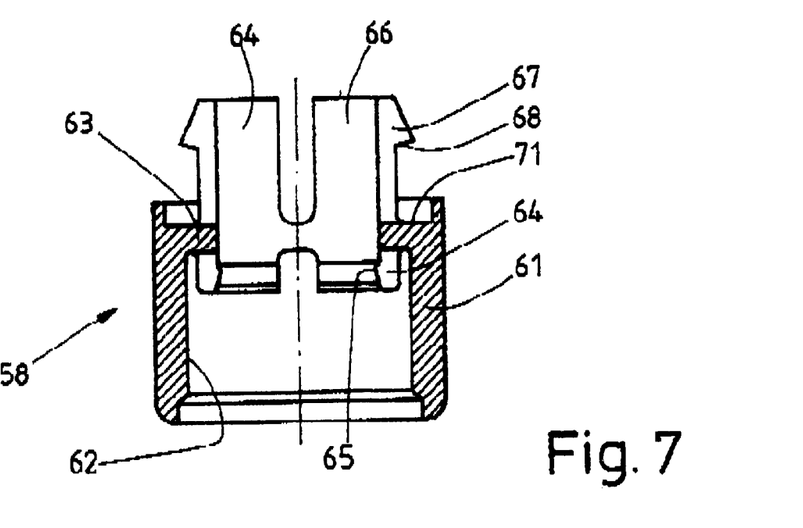
FIG. 7 shows a connecting part of the drinking valve of FIG. 6 in a longitudinal section.
Figure 8:
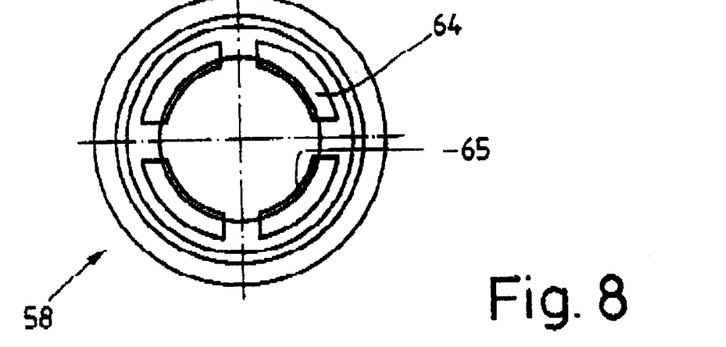
FIG. 8 shows the connecting part of FIG. 7 in a view from below.
Figure 9:
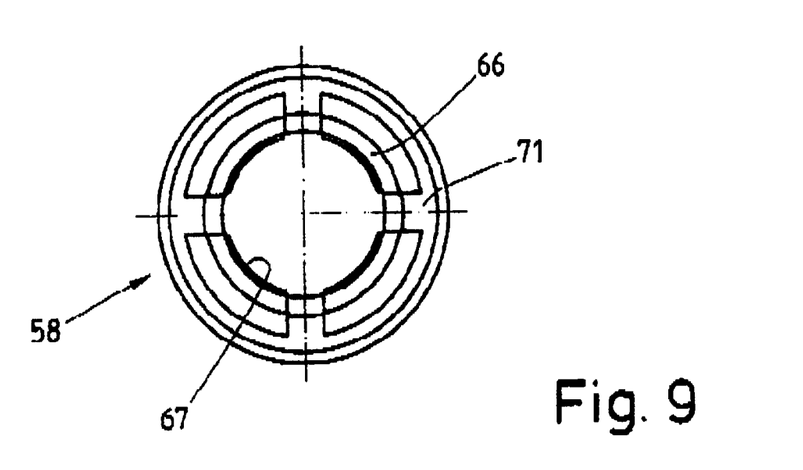
FIG. 9 shows the connecting part of FIG. 7 in a view from above.

The connecting part 58 has a completely rotationally symmetrical configuration. It has, essentially, a cylindrical section 61 with a cylindrical outer wall and a cylindrical inner wall 62. The connecting part 58 has an annular shaped collar 63 at the upper end of the cylindrical inner wall 62. Whereas the cylindrical inner wall 62 of the connecting part 58 is in contact with the central cylindrical region 24 of the acceptance part 14 and forms, at this point, a guide between the acceptance part 14 and the connecting part 58, the internal diameter of the collar 63 is dimensioned in such a way that it corresponds to the external diameter of the upper region 25 of the acceptance part 14 and, at this point, forms a second guide for the acceptance part 14 in the connecting part 58.

Spring tongues 64, which correspond in shape and action to the spring tongues 49 on the connecting part 15 and which serve to form the snap-in connection 59, protrude opposite to the lower surface of the collar 63 of the connecting part 58. Inward-pointing protrusions 65 of the spring tongues 64, which correspond to protrusions 51 of the spring tongues 49, therefore engage in the peripheral groove at the lower end of the upper region 25 of the acceptance part 14.

In order to produce the snap-in connection 60, the connecting part 58 has further spring tongues 66 (four spring tongues 66 again in the embodiment example shown), which protrude upwards opposite to the collar 63 (FIG. 7). These spring tongues 66 are in turn formed by a cylindrical section above the collar 63 because evenly distributed spring tongues 66 are formed on the periphery of the connecting part 58 by corresponding slots. The spring tongues 66 have protrusions 67 protruding outwards. The protrusions 67 each have a triangular shape with a contact surface 68 extending approximately at right angles to the longitudinal centre line 31 of the drinking valve 57. With connecting part 58 placed in the water supply line 10, the protrusions 67 of the spring tongue 66 protrude into the water supply line 10 and, in fact, to such an extent that the contact surfaces 68 of the protrusions 67 come into contact on the inside of the lower wall of the water supply line 10 (FIG. 6). Because the contact surfaces 68 of the protrusions 67 on the spring tongues 66 stand out approximately at right angles, the snap-in connection 60 can no longer be released after the initial insertion of the connecting part 58 into the water supply line 10 or only after the acceptance part 14 has been withdrawn from the connecting part 58. If a lighter snap-in connection 60, or one which can be released at any time, should be desirable, this can take place by a different alignment and shaping of the contact surfaces 68 of the protrusions 67, for example in such a way that the protrusions 67 obtain the shape of the protrusions 65 of the spring tongues 64.

The internal surfaces of the spring tongues 66 correspond to the cylindrical internal contour of the peripheral collar 63 between the lower spring tongues 64 and the upper spring tongues 66. Because of this, the cylindrical internal surfaces of the spring tongues 66 also correspond to the cylindrical region 25 of the acceptance part 14 so that, after the insertion of the acceptance part 14 into the connecting part 58, the spring tongues 66 of the snap-in connection 60 between the connecting part 58 and the water supply line 10 can no longer be pressed together. In consequence, the snap-in connection 60 is positively secured against release so that, in the case of drinking valve 57 mounted on the water supply line 10, the snap-in connection 60 and therefore the connecting part 58 can no longer be released from the water supply line 10 even in the case of releasably shaped protrusions 67 of the spring tongues 66.

In addition to the seal formed by the O-ring 55 between the acceptance part 14 and the connecting part 15 of the casing 12, the drinking valve 57 has an additional seal 69. This seal 69 is located between the connecting part 58 and the lower surface of the water supply line 10. The seal 69 is also formed by an O-ring 70. The latter is located in a peripheral groove 71, open towards the top, of the connecting part 58 and is dimensioned in such a way that it only partially accepts the O-ring 70, so that the latter protrudes upwards out of the groove 71 in the unloaded condition. In order to produce a seal of the connecting part 58 under the water supply line 10, the O-ring 70 is preloaded when the snap-in connection 60 is produced. This takes place by means of corresponding dimensioning of the spring tongues 66. The protrusions 67 of the spring tongues 66 can, namely, only engage over the lower wall of the water supply line 10 from the inside when the connecting part 58 is pressed so firmly under the water supply line 10 that the O-ring 70 is sufficiently preloaded to provide a reliable seal. This preloading is then maintained after the engagement of the spring tongues 66. Slight chamfering (rising towards the outside) of the contact surface 68 of the spring tongues 66 (FIG. 7) can achieve the effect that when the spring tongues 66 are spread apart to produce the snap-in connection 60, the connecting part 58 is pulled against the lower surface of the water supply line 10 and, by this means, the preload on the O-ring 70 of the seal 69 is increased.

The drinking valve 57 is mounted on the water supply line 10 by the connecting part 58, with the O-ring 70, being first snapped into the through hole 47 in the lower wall of the water supply line 10. For this purpose, the connecting part 58, with the spring tongues 66, is pushed through the through-hole 47 in the water supply line 10 and, in fact, sufficiently far for the seal 69 to be preloaded and for the contact surfaces 68 of the spring tongues 66 to engage behind the water supply line 10 from the inside. The remaining part of the drinking valve 57 (FIG. 2) with the acceptance part 14 is then pushed into the connecting part 58, the upper cylindrical region 25 of the connecting part 15 first securing, as a form fit, the spring tongues 66 in their engaged position because the region 25 of the acceptance part 14 obtains contact on the inner cylindrical wall of the spring tongues 66. It is only subsequently, namely when the acceptance part 14 is fully pushed into the connecting part 58, that the snap-in connection 59 between the acceptance part 14 and the connecting part 58 is produced.

When dismantling the drinking valve 57, the acceptance part 15, with the other parts of the drinking valve 57 located within it, is extracted downwards out of the connecting part 58, the snap-in connection 59 between the acceptance part 14 and the connecting part 58 being released first and release of the snap-in connection 60 between the connecting part 58 and the water supply line 10 being prevented by the form-fit locking of the spring tongues 66 in their engaged position by the upper cylindrical region 25 of the acceptance part 14. This ensures that only the snap-in connection 59 is released for dismantling the drinking valve 57 and not the snap-in connection 60 between the connecting part 58 and the water supply line 10. This is because the connecting part 58 can remain on the water supply line 10 and only the part of the drinking valve 57 shown in FIG. 2 has to be exchanged in the case of a defect. If, nevertheless, the connecting part 58 has to be released from the water supply line 10, for whatever reason, the snap-in connection 60 can be released after the complete removal of the acceptance part 14 from the connecting part 58.

What is claimed is:

1. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, at least one connecting means being arranged between the acceptance part (14) and the connecting part (15), and in that at least one seal is arranged between the acceptance part (14) and the connecting part (15, 58).

2. Drinking valve according to claim 1, characterized in that each of said at least one connecting means is arranged in the casing (12).

3. Drinking valve according to claim 2, characterized in that the at least one connecting means is arranged outside the water supply element.

4. Drinking valve according to claim 1, characterized in that the at least one connecting means is arranged outside the water supply element.

5. Drinking valve according to claim 1, characterized in that the acceptance part (14) and at least one internal contour of the connecting part (15, 58) have a substantially rotationally symmetrical configuration.

6. Drinking valve according to claim 1, characterized in that the connecting means are arranged between walls facing towards one another of the acceptance part (14) and of the connecting part (15, 58).

7. Drinking valve according to claim 1, characterized in that the at least one seal is arranged downstream relative to the water delivery direction of the connecting means.

8. Drinking valve according to claim 1, characterized in that at least one guide is arranged between the acceptance part (14) and the connecting part (15, 58).

9. Drinking valve according to claim 8, characterized in that two guides are arranged between the acceptance part (14) and the connecting part (15, 58).

10. Drinking valve according to claim 1, characterized in that at least one upper pin (18) of the valve arrangement (13) is secured in the casing (12) so that it cannot fall out.

11. Drinking valve according to claim 1, characterized in that the connecting part (15) is unreleasably connected to the water supply element.

12. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, at least one connecting means being arranged between the acceptance part (14) and the connecting part (15), and in that the connecting part (15, 58) is guided in a through hole (47) of the water supply element by at least one guide.

13. Drinking valve according to claim 12, characterized in that the at least one guide of the connecting part (15) in the through hole (47) of the water supply element terminates approximately flush with a wall of the water supply line (10) surrounding the through hole (47).

14. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, at least one connecting means being arranged between the acceptance part (14) and the connecting part (15), and in that the casing (12) is connected to the water supply element by an additional snap-in connection (60).

15. Drinking valve according to claim 14, characterized in that the snap-in connection (60) holds the connecting part (58) of the casing (12) in a through hole (47) in the water supply element.

16. Drinking valve according to claim 14, characterized in that the snap-in connection (60) of the connecting part (58) to the water supply element is formed by flexible spring tongues (66) on the connecting part (58) and a sleeve section of the acceptance part (14) which stabilizes the spring tongues (66).

17. Drinking valve according to claim 14, characterized in that the snap-in connection (60) of the connecting part (58) to the water supply element has its own seal (69) associated with it.

18. Drinking valve according to claim 17, characterized in that the seal (69) is preloaded by the snap-in connection (60) of the connecting part (58) to the water supply element.

19. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, and at least one snap-in connection means located between the acceptance part (14) and the connecting part (15).

20. Drinking valve according to claim 19, characterized in that the casing (12) is connected to the water supply element by an additional snap-in connection (60).

21. Drinking valve according to claim 19, characterized in the at least one snap-in connection (60) holds the connecting part (58) of the casing (12) in a through hole (47) in the water supply element.

22. Drinking valve according to claim 19, characterized in the at least one snap-in connection (60) of the connecting part (58) to the water supply element is formed by flexible spring tongues (66) on the connecting part 58 and a sleeve section of the acceptance part (14), which stabilizes the spring tongues (66).

23. Drinking valve according to claim 19, characterized in that the at least one snap-in connection (60) of the connecting part (58) to the water supply element has its own seal (69) associated with it.

24. Drinking valve according to claim 23, characterized in that the seal (69) is preloaded by a snap-in connection (60) of the connecting part (58) to the water supply element.

25. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, at least one connecting means located between the acceptance part (14) and the connecting part (15), and comprising at least one seal between the acceptance part (14) and the connecting part (15, 58), wherein said seal is located downstream relative to the water delivery direction of the connecting means.

26. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, at least one connecting means being located between the acceptance part (14) and the connecting part (15), and comprising two guides between the acceptance part (14) and the connecting part (15, 58).

27. Drinking valve, in particular for small animals such as hens, having a casing (12), which can be connected to a water supply element, and having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, at least one connecting means located between the acceptance part (14) and the connecting part (15), and the connecting part (15) is guided in a through hole (47) of the water supply element by at least one guide.

28. Drinking valve, in particular for small animals such as hens, having a casing (12), which can be connected to a water supply element, having a valve arrangement (13) supported in the casing (12), of which valve arrangement (13) an actuation end (35) protrudes from the casing (12) underneath, characterized in that the casing (12) has an acceptance part (14) for at least one part of the valve arrangement (13) and a connecting part (15) for connecting the acceptance part, with the valve arrangement (13), to the water supply element, wherein at least one connecting means is located between the acceptance part (14) and the connecting part (15), and said casing (12) being connected to the water supply element by an additional connection (60).

* * * * *